US012754079B2

(12) United States Patent
Goldenberg

(10) Patent No.: US 12,754,079 B2
(45) Date of Patent: Oct. 6, 2026

(54) POOL CLEANING ROBOT WATER TEMPERATURE ESTIMATION

(71) Applicant: Maytronics Ltd., Kibutz Yizrael (IL)

(72) Inventor: Gilad Goldenberg, Kfar saba (IL)

(73) Assignee: Maytronics Ltd., Kibutz Yizrael. (IL)

( * ) Notice: Subject to any disclaimer, the term of this patent is extended or adjusted under 35 U.S.C. 154(b) by 387 days.

(21) Appl. No.: 18/550,119

(22) PCT Filed: Mar. 11, 2022

(86) PCT No.: PCT/IB2022/052221

§ 371 (c)(1),
(2) Date: Sep. 11, 2023

(87) PCT Pub. No.: WO2022/190063

PCT Pub. Date: Sep. 15, 2022

(65) Prior Publication Data

US 2024/0159597 A1 May 16, 2024

Related U.S. Application Data

(60) Provisional application No. 63/159,947, filed on Mar. 11, 2021.

(51) Int. Cl.
*G01K 3/10* (2006.01)
*E04H 4/16* (2006.01)

(52) U.S. Cl.
CPC ............. *G01K 3/10* (2013.01); *E04H 4/1654* (2013.01); *G01K 2217/00* (2013.01)

(58) Field of Classification Search
CPC ..... G01K 3/10; G01K 2217/00; E04H 4/1654
See application file for complete search history.

(56) References Cited

U.S. PATENT DOCUMENTS

| | | | | |
|---|---|---|---|---|
| 10,927,559 | B2 * | 2/2021 | Kehati | E04H 4/1654 |
| 2004/0230344 | A1 | 11/2004 | Gallupe et al. | |
| 2005/0006288 | A1 | 1/2005 | Bauckman et al. | |
| 2014/0166045 | A1 * | 6/2014 | Herring | E04H 4/1654 134/1 |
| 2016/0060887 | A1 * | 3/2016 | Tryber | E04H 4/1263 15/1.7 |
| 2018/0135325 | A1 * | 5/2018 | Schloss | E04H 4/1654 |
| 2018/0238069 | A1 * | 8/2018 | Kehati | C02F 1/001 |
| 2022/0220759 | A1 * | 7/2022 | Adams, III | E04H 4/1272 |
| 2023/0400445 | A1 * | 12/2023 | Key | G01K 7/22 |

* cited by examiner

*Primary Examiner* — Ricky Go
(74) *Attorney, Agent, or Firm* — Reches Patents

(57) ABSTRACT

A method for determining a temperature of a fluid of a pool, the method may include: measuring at least one pool cleaning robot (PCR) parameter in relation to a period of time and by one or more PCR sensors located within an interior of the PCR; calculating at least one period of time PCR parameter; determining at least one value of at least one PCR parameter weight based on at least one value of the at least one period of time PCR parameter; and determining the temperature of the fluid of the pool based on the at least one period of time PCR parameter and the at least one PCR parameter weight.

25 Claims, 6 Drawing Sheets

400

410

500

POOL CLEANING ROBOT WATER TEMPERATURE ESTIMATION

FIELD OF THE INVENTION

This embodiment relates to Pool Cleaning Robot (PCR) measuring and estimating swimming pool water temperatures.

BACKGROUND OF THE INVENTION

The swimming pool industry is divided into two main classes. The first is the public pool sector that may be defined by pool sizes, volumes of water contained and the fact that these may be business or commercially oriented pool owners. It may also be defined by the number of visitors and users to such a pool. i.e.: it is common to see a small/medium sized public pool with a size of say 12 m×6 m that accommodates a large number of swimmers. This group will comprise of Olympic pools, hotel pools, hostels, caravan park pools, large recreational swimming pools but also smaller community pools that may all need to comply with strict public health regulations governing this sector in their respective countries or municipalities.

The second and possibly the larger pool sector includes the privately owned swimming pools that may usually be smaller in sizes, in their water volumes and in number of swimmers. Such pools may not always need to comply with strict water quality regulations.

The public pools sector is usually compelled to install water temperature measurement devices or equipment because of governing regulations. The privately owned pool owners' sector does not compel the private owner to do so but nevertheless, pool operators or owners may want to know what the pool water temperature is for various reasons.

The most mundane of reasons may be to swim or allow customers to swim in reasonably temperate waters that are not too warm or hot or not too cold.

In this sense it is of advantage to the end user to know what the temperature stratifications of the pool water are. Namely, the temperatures at different depths—from the bottom and up to the waterline.

With the use of water heaters it is increasingly important to save on energy and operating costs.

It is equally important to save on energy operating costs when using water pool covers to store and save heated pool water while further ensuring the water is not overheated.

DESCRIPTION OF THE PREFERRED EMBODIMENTS

Pool water temperatures are not unitary but stratified by water layers. Namely, measuring the water surface with a thermometer at a specific point does not provide the actual water temperature at the pool's center or at its bottom floor.

Pool water chemistry may also be affected by varying temperatures. Warm water tends to float to the surface and evaporate along with certain chemicals that may further detrimentally interact with sunlight or ambient UV radiation.

With increased need to comfortably use swimming pools, along with the concern for effective pool water management, hygiene, cleanliness, health, comfort of bathers and regulation of specific water quality parameters, there is a growing need for water temperature sensing/probing at an affordable price.

BRIEF DESCRIPTION OF THE DRAWINGS

In order to understand the invention and to see how it may be conducted in practice, preferred embodiments will now be described, by way of non-limiting examples only, with reference to the accompanying drawings.

SUMMARY OF THE INVENTION

Figure 1:
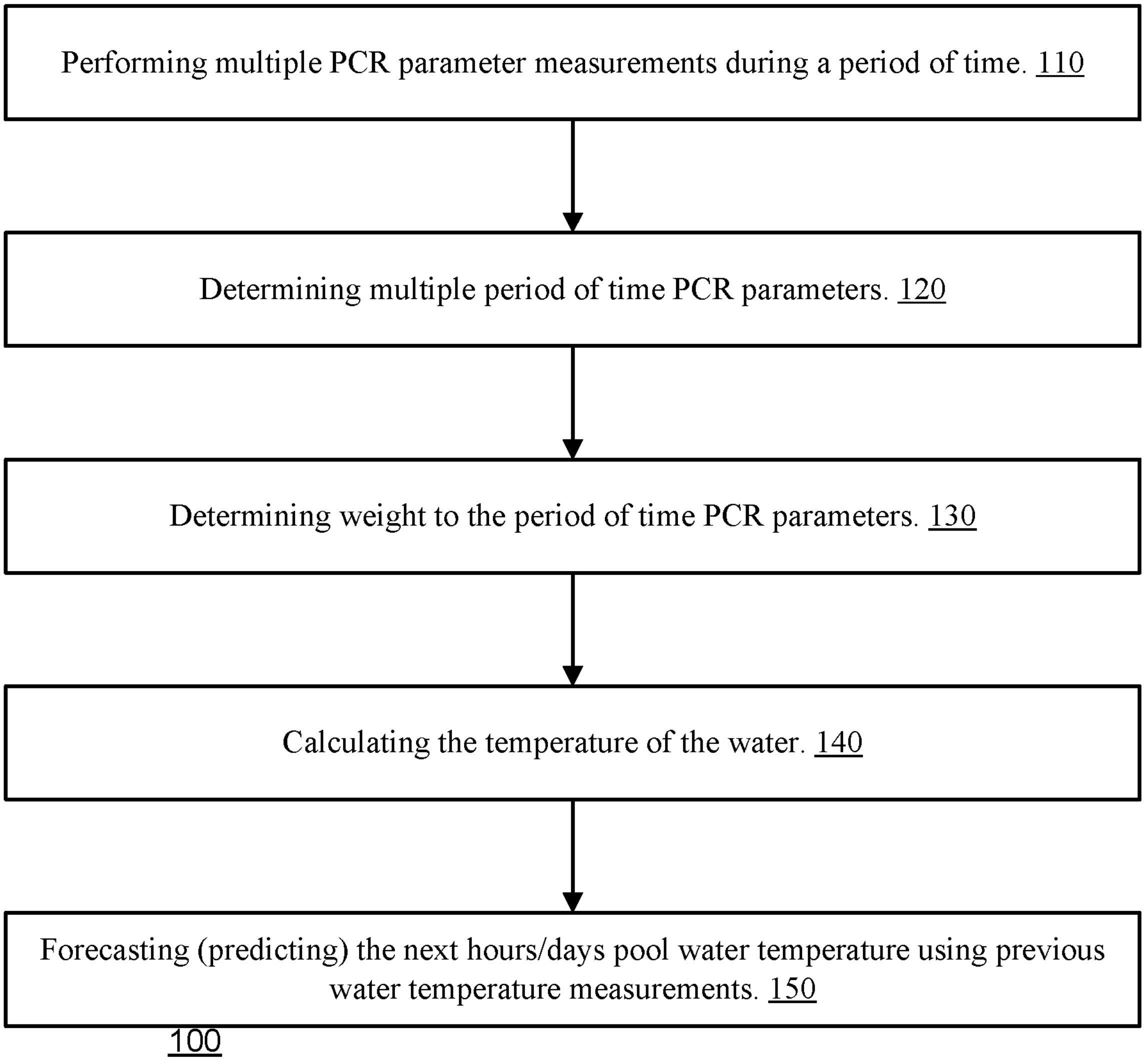
FIG. 1 is an example of a method.

There is provided a self-propelled PCR that employs an onboard integrated temperature sensor that may be located inside a hermetically water sealed unit that may contain a central PCB control device, at least one pump motor and at least one drive motor so that the said temperature sensor may determine the underwater temperatures without having any actual direct contact with the surrounding water when the PCR is submerged in the pool or with the outside air when the PCR is not submerged under water; the said sensor is able to transmit accumulated data measurements to the PCB who may process and store the said data and also to advise the PCR operator accordingly.

The term pool means any vessel that is capable of containing fluid.

The term 'thermometer' or 'temperature measurement device or system' means any process of analyzing the water temperature.

Specifically, the invention relates to a remote temperature sensing and analysis of the swimming pool water by employing an indirect temperature sensing device, system and method.

All communications of the preferred embodiments are meant to collect pool temperature conditions over time and advise the end user about the state of the swimming pool water over stretches of time; and automatically—or subject to a manual command—proceed to regulate physical swimming in the pool or to activate ancillary equipment that serve the swimming pool such as, but not exclusively, pool heaters or pool covers and the like.

Data collected may be stored on the internet, in a cloud account for the PCR owner to view the temperature profile of his or her pool over long stretches of time.

The PCR OEM may also request the PCR owner to share such data with them.

DESCRIPTION OF THE PREFERRED EMBODIMENTS

Because the apparatus implementing the present invention is, for the most part, composed of optical components, sensors and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

The word "may include" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Any reference to either one of a PCR, a system, a method and a non-transitory computer readable medium should be applied, mutatis mutandis, to any other of the PCR, the system, the method, and the non-transitory computer readable medium. For example—any reference to a PCR may be applied mutatis mutandis to a method executed by the PCR, and/or may be applied mutatis mutandis, to a non-transitory computer readable medium that stores instructions to be executed by the PCR.

Any number (number of components, values of variables such as x and y, duration of measurements, and the like) provided in the application is merely a non-limited example and/or may be determined in any manner.

There may be provided a system that is configured to measure temperature of pool water using a pool cleaning robot (PCR) and an on-board temperature probe that is positioned inside the PCR sealed motor unit or a sealed motor that are waterproof/dry units without having any contact with the water.

The PCR may include a housing, at least one inlet and outlet, at least one filtering element, at least one pump motor, a propulsion system, wheels and/or tracked wheels, pool surfaces brushing elements, an electrical power received from a tethered cable from an external power supply or on-board batteries.

Inside the PCR motor unit there are at least one pump and drive motors, a PCB control unit that contains a processing circuit such as an electrical current sensor/microcontroller unit (MCU)/pressure probe/temperature probes/motor drivers and so on.

The inner space and PCB inside the motor unit (or motor(s)) consists of air and doesn't have contact with the pool water and they are therefore subjected to the heat that are generated by the at least one motor. Additional heat is generated by the PCB, the MCU and motor drivers.

The temperature of the space inside the motor unit and PCB are therefore derived from external pool water temperature, motor(s) generated heat temperatures and PCB components generated heat.

Figure 5:
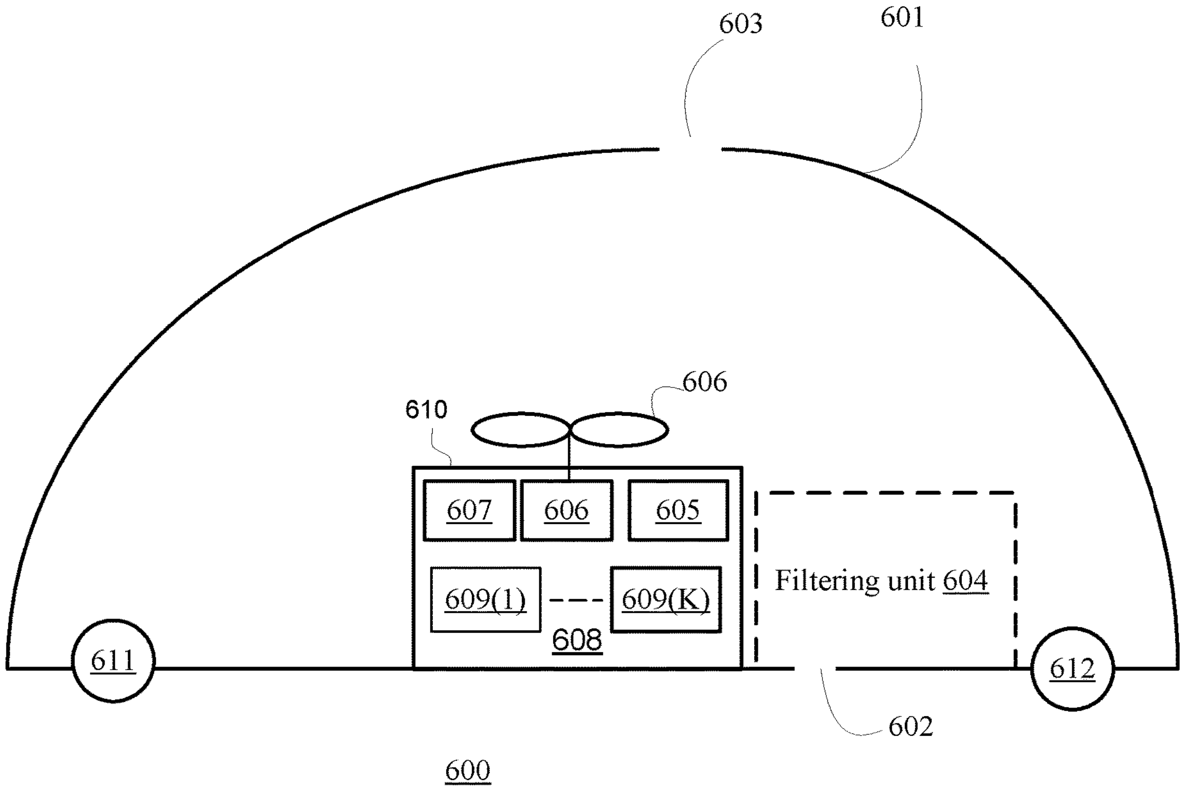
FIG. 5 illustrates an example of a PCR.

Furthermore, the temperature sensor may be located inside the waterproofed motor unit housing that is surrounded by pool water that is was drawn from an inlet to an outlet via a filtering unit. This water may also be relatively immoveable when the PCR is not pumping water. See—for example FIG. 5 illustrating PCR 600 that includes a housing 601, fluid inlet 602, fluid outlet 603, filtering unit 604, motor unit housing 610 that may be waterproof. The following components are illustrated as being within an inner space 608 defined by the motor unit housing—drive motor 605, pump motor 606, controller (for example MCU) 607, and sensors 609(1)-609(K), K being an integer that exceeds one.

The water inside the housing also serves as a cooling medium for the motor unit so the water inside the housing may have a slightly higher temperature than the pool water, especially when the pump motor is not in operation.

The temperature sensor may therefore measure the pool water that is external to the PCR housing thereby, negotiating passed two rigid barriers: the motor unit enclosure barrier and the PCR housing barrier.

There may be provided a method that may include calculating the pool water temperature. The pool water is measure as the average temperature that the robot measures during its cleaning cycle time in the pool. The pool may have different temperatures at different location in the pool, for example when the ambient external temperatures are high due to for example, a strong sun and the pool main pump doesn't work for a few hours, there can be a difference between the pool bottom and pool upper water surface. It is important to know that the temperature measurement will be an average of the pool water.

Taking into consideration the internal heat generated inside the motor unit PCB/Motors or at least within the sealed motor, the pool water temperature may be derived over a duration of anything between 30 seconds and up to 30 minutes as it takes some time to estimate pool water temperature.

The measuring the pool water temperature may include:

a. Measuring the present temperature inside the motor unit by an on-board temperature probe that is attached onto the said PCB.
b. Measuring the temperature rise inside the motor unit over a certain period of time, for example, temperature after 5 minutes minus the temperature after 1 minutes from the start of the PCR cycle. Other time periods may be used.
c. Measuring the electrical current consumption of the motors as measured by current measurement probes on the PCB.
d. Measuring the change in ambient pressure inside the motor unit that may be measured by an optional on-board pressure sensor. Namely, if there is a pressure sensor positioned inside, the nominal pressure value inside the motor unit may be between 1000 to 1200 mbar, when the PCR starts its work. The pressure will rise in correlation to the water temperature and internal motor unit temperature. Hence, it might help to the pool water temperature estimation.
e. Measurements specifics that involve the embodiment of acquiring data that comprises temperature, pressure, and electrical current measurements of the PCR motors are specified herewith.

FIG. 1 illustrates an example of method 100.

Method 100 may start by step 110 of performing multiple PCR parameter measurements during a period of time:

a. After x minutes from cycle start, MCU reads on PCB temperature sensor: T1
b. After x+y minutes from cycle start, MCU reads on PCB temperature sensor: T2
c. After x minutes from cycle start, MCU reads on PCB pressure sensor: P1
d. After x+y minutes from cycle start, MCU reads on PCB pressure sensor: P2
e. After x+y minutes, MCU reads and computes average electrical current of motor 1—I1

After x+y minutes, MCU reads and computes average electrical current of motor 2—I2 g. After x+y minutes, MCU reads and computes average electrical current of motor 3—I3
h. Measure the average current consumption of one or more motors (for example three motors having an average current consumption of I1, I2 and I3) between start point in time (x minutes from start of cycle) to an end point of time (x+y minutes from the start of the cycle).

Step 110 may be followed by step 120 of determining multiple period of time PCR parameters:

a. Determining the difference between temperatures measured at two point in time (after x+y minutes and after x minutes)): ST=(T2−T1).

b. Determining the difference between pressures measured at two point in time (after x+y minutes and after x minutes)): SP=(P2−P1).

c. Determine the average current consumption of one or more motors of the PCR over the period of time.

Step 120 may be followed by step 130 of determining weight to the period of time PCR parameters:

a. MCU finds the range of ST, SP, I1, I2, I3 values from 3 pre-defined tables (example of finding ft from the ST value shown in the next paragraph) that the MCU has stored in its memory, and by that, find the factor of every value (ft factor for ST slope and fp factor for SP, fi1, fi2, fi3 factors for the current values I1,I2,I3). Any value may be associated with his own table. A table may be provided per combinations of two or more parameters.

b. An example of taking a factor from a table:

the robot read T1 and T2 after x+y minutes, then it calculates ST (ST=T2−T1).

For example, assume that ST=0.7 in our case, so ST=(T2−T1)=0.7, this means we'll pick row number 6 because 0.7 is between 0 and 1, so: ft=0.4.

TABLE 1

'ST to Factor' a table for findinf ft coefficient from ST

| Row # | ST range min range | ST range max range | ft coefficient |
|---|---|---|---|
| 1 | −5 | −4 | 2.1 |
| 2 | −4 | −3 | 2 |
| 3 | −3 | −2 | 1.5 |
| 4 | −2 | −1 | 1 |
| 5 | −1 | 0 | 0.5 |
| 6 | 0 | 1 | 0.4 |
| 7 | 1 | 2 | 0.7 |
| 8 | 2 | 3 | 0.8 |
| 9 | 3 | 4 | 0.93 |
| 10 | 4 | 5 | 1.2 |

Step 130 may be followed by step 140 of calculating the temperature of the water.

$$\text{Water temperature}=ST*ft+SP*fp+I1*fi1+I2*fi2+I3*f3+T2-f3 \quad (1)$$

If we use all the factors in the formula.

$$\text{Water temperature}=ST*ft+SP*fp+T2-f3 \quad (2)$$

If we use just temperature and pressure factors.

$$\text{Water temperature}=ST*ft+I1*fi1+I2*fi2+I3*f3+T2-f3 \quad (3)$$

If we use just current and temperature factors.

$$\text{Water temperature}=ST*ft+T2-f3 \quad (4)$$

If we use just temperature the factors.

WHERE:

T1—IS the temperature after x minutes

T2—IS the temperature after x+y minutes

P1—is the pressure after x minutes

P2—is the pressure after x+y minutes

ST—is T2−T1

SP—is P2−P1 ft—is the factor of temperature given ST to the ST to factor table fp—is the factor of temperature given SP to the SP to factor table fi1—is the factor of temperature given I1 to the 'I1 to factor' table fi2—is the factor of temperature given I2 to the 'I2 to factor' table fi3—is the factor of temperature given I2 to the 'I3 to factor' table Step 140 may be followed by step 150 of forecasting (predicting) the next hours/days pool water temperature using previous water temperature measurements.

Figure 2:
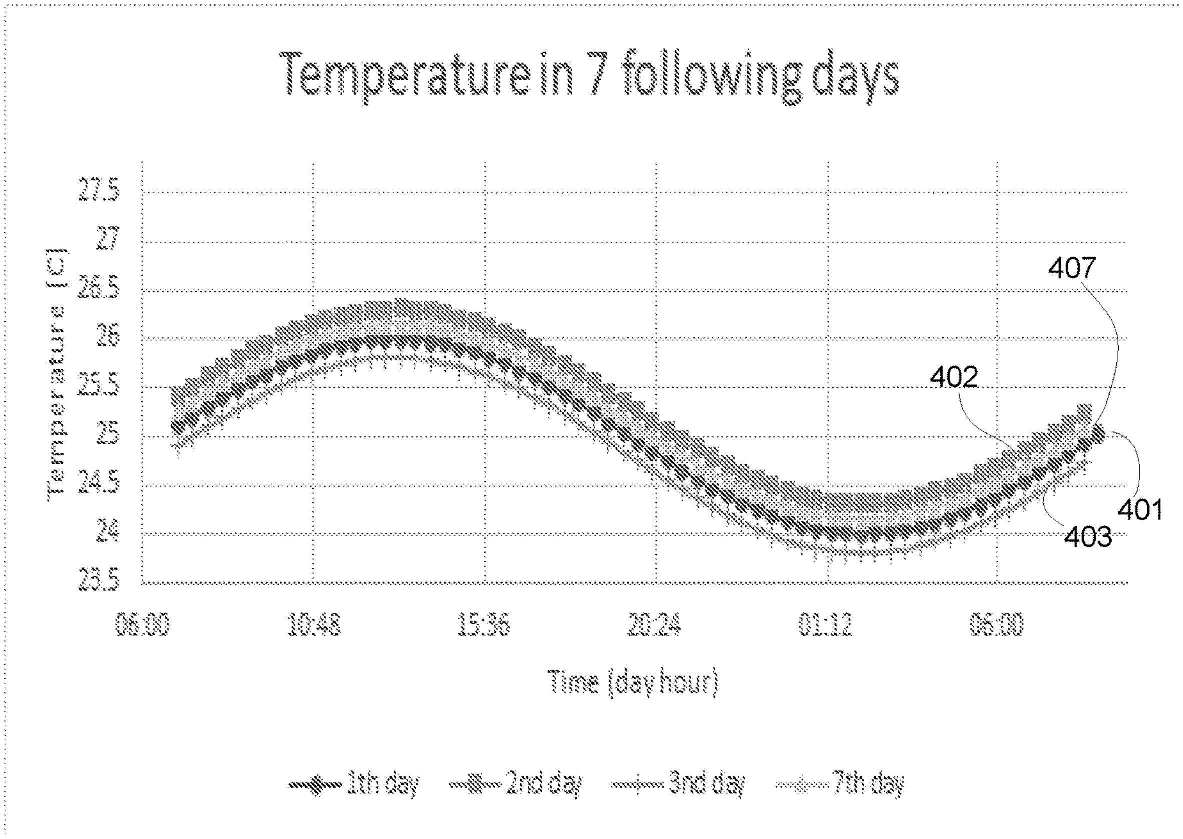
FIG. 2 is an example of temperature readings.
Figure 3:
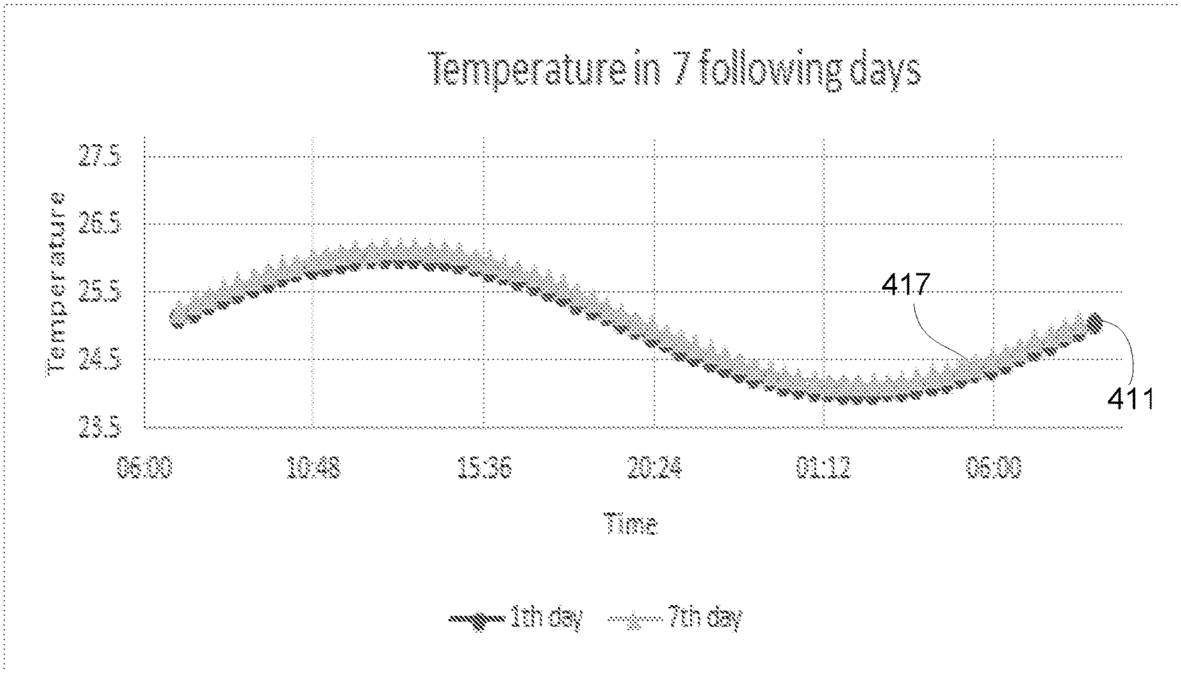
FIG. 3 is an example of temperature readings.

Examples of Technical a. Customer first use of the PCR b. MyDolphin App helps the end user to communicate with the PCR, in the first use of the PCR (or after if the end user doesn't want to do it in the first use), the App asks the customer to submerge the PCR in the water for a few hours (the PCR can also perform cleaning during at least a part of this time. Time required may be at least 6 (or other number of) hours between 14:00 and 20:00 and preferred to be closest to 24 hours straight.

c. In this time, the PCR Power Supply takes temperature measurements every 20 minutes to form the pool temperature Vs time 'sinus wave':

d. For example, assume that the real water temperature of the pool was measured on the 1$^{st}$ day when the user submerged the PCR inside the pool for a few hours. After that, if the robot is not submerged in the water for the next 7 days (the 2$^{nd}$ and 3$^{rd}$ up to the 7$^{th}$ day). FIG. 2 illustrates a graph 400 that shows the temperature on the 1st 2nd, 3rd and 7$^{th}$ day—see curves 401, 402, 403 and 407, respectively.

e. results from real experiments in pools, showed that for most cases, the temperature in the pools in 3 following days are almost the same with about +−0.3 [Celsius] differences. (see FIG. 2: 1$^{st}$, 2$^{nd}$ and 3$^{rd}$ days)

f. The experiment results also showed that for each season, the amplitude of the temperature sinus wave is remarkably similar at all days.

g. After more than 3 days, there is a better chance that the temperature will have a bigger difference than +0.3[C] in each point of time. Example: in the 1$^{st}$ day, at 10:48, the pool water temperature is 25.7[C], and on the 2$^{nd}$ and 3$^{rd}$ days the temperatures are: 26[C] and 25.4[C]. but on the 7$^{th}$ day, the temperature at 10:48, is 27[C]—an +1[C] error.

h. To avoid this big error in the 7$^{th}$ day, we will take at least 1 measurement each time the PCR enters the pool for a cleaning cycle and take at least one temperature measurement that will fix the '1$^{st}$ day temperature wave' up or down (under the assumption in paragraph 'f' that days that all temperature wave in all days in the season has the same amplitude).

i. For example, lets 'fix' the 1$^{st}$ day wave from one point of the 7$^{th}$ day temperature wave. Taking 10:48 time in the 7$^{th}$ day: temperature=27, and fix the 1$^{st}$ day wave to be similar to the 7th day wave—see graph 410 of FIG. 3 and curves 411 and 417, respectively.

CALIBRATION: The PCR will be submerged in the pool water for few hours straight once a season, but the PCR may alternatively be submerged 2-3 times a week for about 2-3 hours each time for exact re-calibration (see, for example—FIG. 4).

Figure 4:
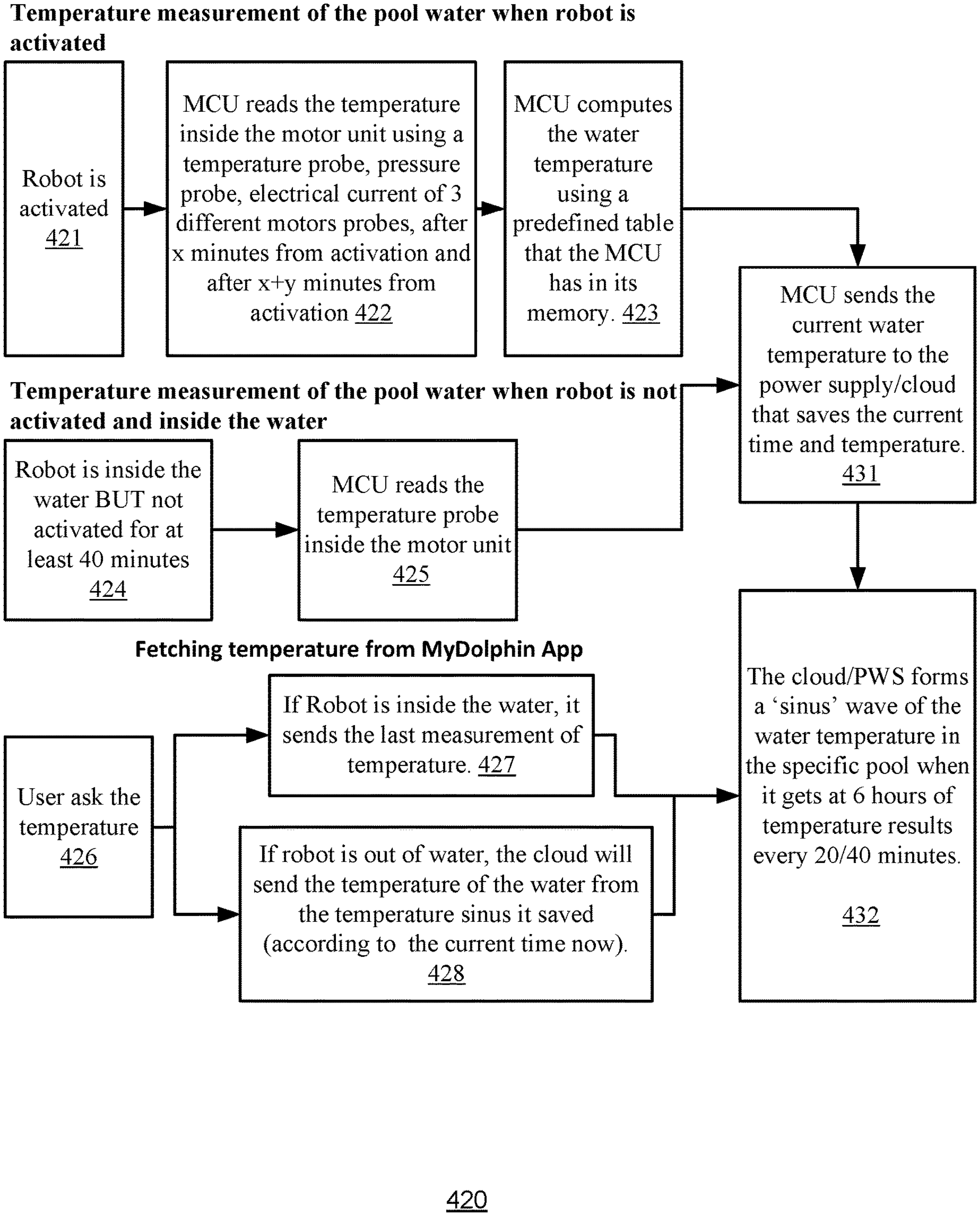
FIG. 4 illustrates an example of a method.

FIG. 4 illustrates various steps 421, 422, 423, 424, 425, 426, 427, 428, 431 and 432 for determining temperature under different scenarios.

The OEM producer may collect multiple temperature readings over time, in different geographical regions, different seasons and so on. said measurements may be used to deduct pool water conditions of a pool end user pool. example: pool owner A&B live in the same city, have the same type of pool i.e: a non-covered external pool.

Assumptions are made (by the OEM) to define the pool profile of each pool by way of measuring its water temperature over time. Wide variations in temperature may indicate an external pool exposed to the elements.

A more steady and constant temperature reading over time may indicate a covered pool or an indoor pool such as public or Olympic pool.

If customer A didn't use his PCR in his pool for a whole week and we see costumer B temperature rising significantly, we can assume at least a slight rise in costumer.

The data may be stored in any manner—for example may be stored in cloud server (for example AWS cloud) server.

Figure 6:
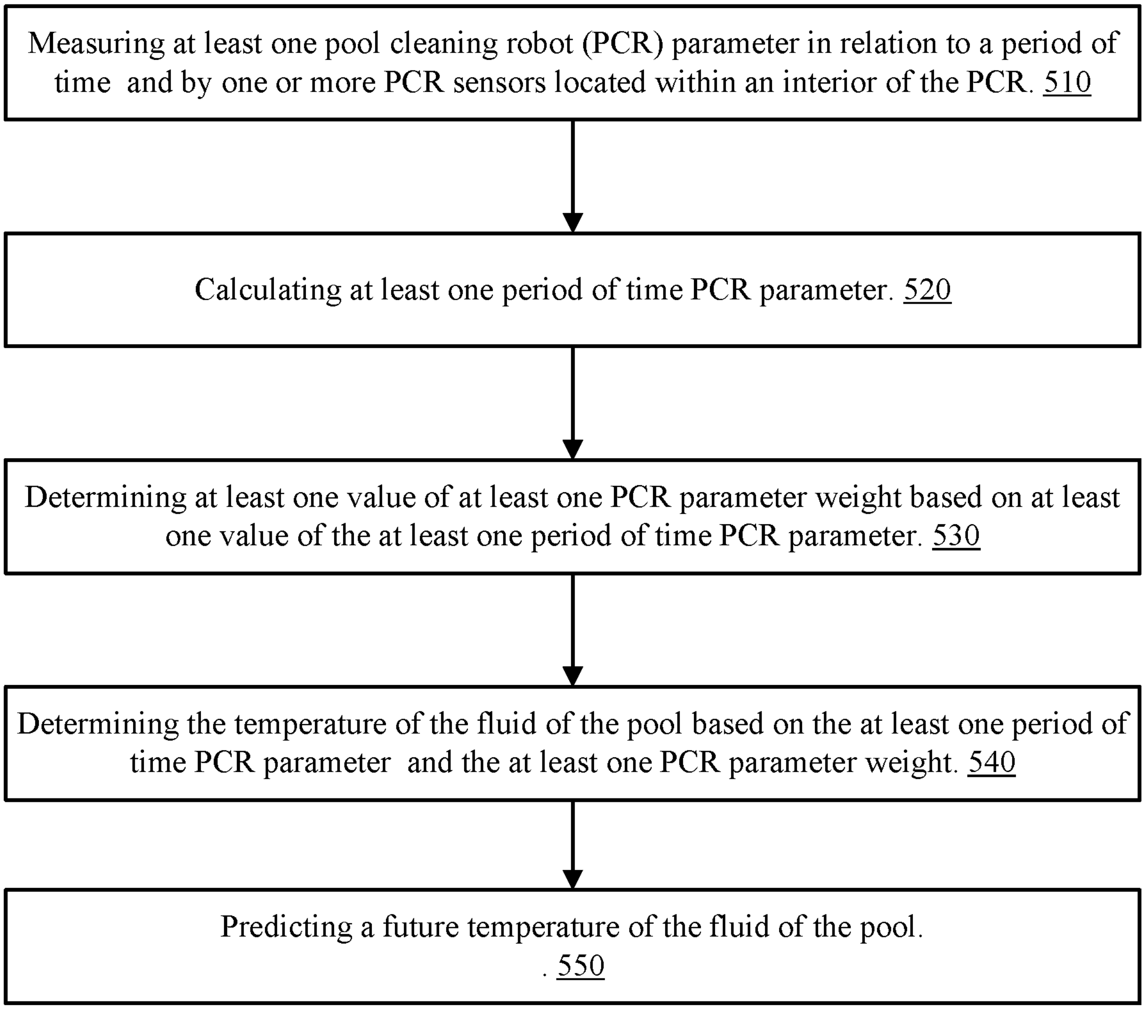
FIG. 6 illustrates an example of a method.

FIG. 6 illustrates an example of a method 500 for determining a temperature of a fluid of a pool.

Method 500 may start by step 510 of measuring at least one pool cleaning robot (PCR) parameter in relation to a period of time and by one or more PCR sensors located within an interior of the PCR.

The at least one PCR parameter may be at least one of a temperature within the interior of the PCR, a pressure level within the interior of the PCR, or a current consumption of one or more motors of the PCR.

Step 510 may be repeated the measuring at least one every three days.

Step 510 may be executed within an inner space the PCR that is isolated from at least a part of a housing of the pool.

Step 510 may be executed within an inner space the PCR that is isolated by at least two spaced apart interior walls from an exterior of the PCR.

Step 510 may include or may be preceded by selecting the at least one PCR parameter based on whether the PCR is working or is idle for at least a predefined period before the selecting. For example—selecting the at least one PCR parameter to comprise a current consumption of one or more motors of the PCR when the PCR is working when performing the selecting.

Step 510 may be followed by step 520 of calculating at least one period of time PCR parameter.

The at least one period of time PCR parameter may be selected out of (a) a difference over the period of time of a temperature within the interior of the PCR, (b) difference over the period of time of a pressure level within the interior of the PCR, or (b) an average current consumption over the period of time of a current consumption of one or more motors of the PCR.

The at least one PCR parameter may be a single PCR parameter.

The at least one PCR parameter may be multiple PCR parameters.

Step 520 may be followed by step 530 of determining at least one value of at least one PCR parameter weight based on at least one value of the at least one period of time PCR parameter.

Step 530 may be followed by step 540 of determining the temperature of the fluid of the pool based on the at least one period of time PCR parameter and the at least one PCR parameter weight.

Step 540 may include calculating a weighted sum of values of the multiple PCR parameters. The calculating of the weighted sum may include adding products of multiplications between PCR parameters and corresponding PCR parameter weights.

Step 530 may be based on a mapping between values of a PCR parameter difference and values of the PCR parameter weight. Table 1 is an example of a mapping. Each period of time PCR parameter may have its own table of function.

A value of the at least PCR parameter is an average value over a period between different points in time of the period of time.

Step 540 may be followed by step 550 of predicting a future temperature of the fluid of the pool.

Step 540 may include determining a current temperature of the fluid of the pool.

Step 550 may be based on the current temperature of the fluid of the pool.

Step 550 may also be based on a temperature to time mapping. The temperature to time mapping may map temperature values to time of day. See, for example FIGS. 2 and 3.

Step 550 may be based on a current temperature of a fluid of another pool.

Step 560 may be is based on a current temperature of a fluid of another pool having similar properties to the pool.

In any of the methods above—the calculated temperature and/or the predicted temperature of the fluid of the pool may be stored, may be transmitted, may be sent to storage, may trigger an alert, may be sued for calculating whether to clean the pool, and the like.

There may be provided a method for determining a temperature of a fluid of a pool. The method may include obtaining a temperature to time mapping; and predicting a future temperature of the fluid of the pool based on the temperature to time mapping.

The predicting is also based on a current temperature of the fluid of the pool.

The method may include calculating the current temperature of the fluid of the pool based on one period of time PCR parameter.

The calculating of the current temperature may include measuring at least one pool cleaning robot (PCR) parameter in relation to a period of time and by one or more PCR sensors located within an interior of the PCR.

The calculating the current temperature of the fluid of the pool may include executing method 100 or executing method 500 or performing any other execution. For example—the calculating may include calculating a weighted sum or any other function.

There may be provided a non-transitory computer readable medium for determining a temperature of a fluid of a pool, the non-transitory computer readable medium may store instructions for: obtaining a temperature to time mapping; and predicting a future temperature of the fluid of the pool based on the temperature to time mapping.

There may be provided a pool cleaning robot (PCR) having temperature measurement capabilities, the PCR may include a processing circuit that is configured to: obtain a temperature to time mapping; and predict a future temperature of the fluid of the pool based on the temperature to time mapping.

The prediction is also based on a current temperature of the fluid of the pool.

The PCR may include one or more PCR sensors that are located within an interior of the PCR and are configured to measure at least one pool cleaning robot (PCR) parameter in relation to a period of time.

The processing circuit may be configured to determine the current temperature of the fluid of the pool based on the at least one PCR parameter.

The processing circuit may be configured to calculate the current temperature of the fluid of the pool based on one or more period of time PCR parameters.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a pool cleaning robot as including a certain component should also cover the scenario in which the pool cleaning robot does not include the certain component. For example—any reference to a method as including a certain step should also cover the scenario in which the method does not include the certain component. Yet for another example—any reference to a pool cleaning robot that is configured to perform a certain operation should also cover the scenario in which the pool cleaning robot is not configured to perform the certain operation.

The terms "pool cleaner" and "pool cleaning robot" are used in an autonomous manner and may refer to a self-propelled pool cleaner.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of pool cleaning robot that is illustrated in any of the figures and/or specification and/or the claims may be provided.

Any combination of any pool cleaning robot illustrated in any of the figures and/or specification and/or the claims may be provided.

Any combination of any set of pool cleaning robots illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for determining a temperature of a fluid of a pool, the method comprises:

measuring pool cleaning robot (PCR) parameters multiple times during a period of time and by one or more PCR sensors located within an interior of the PCR; the measuring is executed by the one or more PCR sensors without having direct contact with the fluid of the pool and while the PCR is located at different locations within the pool;

transmitting the multiple PCR parameters to a processor of the PCR that is located within a waterproof inner housing of the PCR;

calculating, by the processor, period of time PCR parameters;

determining, by the processor, values of PCR parameter weights based on values of the period of time PCR parameters; and determining, by the processor, the temperature of the fluid of the pool, the determining of the temperature of the fluid of the pool comprises calculating a weighted sum by adding products of multiplications between the PCR parameters and corresponding PCR parameter weights.

2. The method according to claim 1 wherein the PCR parameters comprises at least two of (a) a temperature within the interior of the PCR, (b) a pressure level within the interior of the PCR, or (b) a current consumption of one or more motors of the PCR.

3. The method according to claim 1 wherein the period of time PCR parameters comprise at least two of (a) a difference over the period of time of a temperature within the interior of the PCR, (b) difference over the period of time of a pressure level within the interior of the PCR, or (b) an average current consumption over the period of time of a current consumption of one or more motors of the PCR.

4. The method according to claim 1 wherein the measuring occurs during a cleaning cycle of the PCR.

5. The method according to claim 1, further comprising automatically activating ancillary equipment that controls a temperatures of the fluid of the pool.

6. The method according to claim 1 wherein the determining of a value of a PCR parameter weight is based on a mapping between values of a PCR parameter difference and values of the PCR parameter weight.

7. The method according to claim 1 comprising selecting the PCR parameters based on whether the PCR is working or is idle for at least a predefined period before the selecting.

8. The method according to claim 7 comprising selecting the PCR parameters to comprise a current consumption of one or more motors of the PCR when the PCR is working when performing the selecting.

9. The method according to claim 1 wherein a value of each PCR parameter is an average value over a period between the different points in time.

10. The method according to claim 1 comprising predicting a future temperature of the fluid of the pool.

11. The method according to claim 10 wherein the determining of the temperature of the fluid of the pool comprises determining a current temperature of the fluid of the pool.

12. The method according to claim 11 wherein the predicting of the future temperature of the fluid of the pool is based on the current temperature of the fluid of the pool.

13. The method according to claim 12 wherein the predicting of the future temperature of the fluid of the pool is also based on a temperature to time mapping.

14. The method according to claim 13 wherein temperature to time mapping maps temperature values to time of day.

15. The method according to claim 10 wherein the predicting of the future temperature of the fluid of the pool is based on a current temperature of a fluid of another pool.

16. The method according to claim 10 wherein the predicting of the future temperature of the fluid of the pool is based on a current temperature of a fluid of another pool having similar properties to the pool.

17. The method according to claim 1 comprising repeating the measuring at least one every three days.

18. The method according to claim 1 wherein the measuring is executed within an inner space of the PCR that is isolated from at least a part of a housing of the pool.

19. The method according to claim 1 wherein the measuring is executed within an inner space of the PCR that is isolated by at least two spaced apart interior walls from an exterior of the PCR.

20. A non-transitory computer readable medium for determining a temperature of a fluid of a pool, the non-transitory computer readable medium stores instructions for:

measuring pool cleaning robot (PCR) parameters multiple times during a period of time by one or more PCR sensors located within an interior of the PCR; the measuring is executed by the one or more PCR sensors without having direct contact with the fluid of the pool and while the PCR is located at different locations within the pool;

transmitting the multiple PCR parameters to a processor of the PCR that is located within a waterproof inner housing of the PCR;

calculating, by the processor, period of time PCR parameters;

determining, by the processor, values of PCR parameter weights based on values of the period of time PCR parameters; and determining, by the processor, the temperature of the fluid of the pool, the determining of the temperature of the fluid of the pool comprises calculating a weighted sum by adding products of multiplications between the PCR parameters and corresponding PCR parameter weights.

21. The non-transitory computer readable medium according to claim 20, wherein the measuring occurs during a cleaning cycle of the PCR.

22. The non-transitory computer readable medium according to claim 20, wherein the non-transitory computer readable medium further stores instructions for automatically activating ancillary equipment that controls a temperatures of the fluid of the pool.

23. A pool cleaning robot (PCR) having temperature measurement capabilities, the PCR comprises:

a processing circuit; and one or more PCR sensors that are located within an interior of the PCR and are configured to measure multiple times during a period of time PCR parameters and while the PCR is located at different locations within the pool; and to transmit the multiple PCR parameters to the processing circuit;

wherein the processing circuit is configured to:

calculate period of time PCR parameters;

determine values of PCR parameter weights based on values of the period of time PCR parameters; and determine the temperature of the fluid of the pool, the determining of the temperature of the fluid of the pool comprises calculating a weighted sum by adding products of multiplications between the PCR parameters and corresponding PCR parameter weights.

24. The PCR according to claim 23, wherein the one or more PCR sensors are configured to measure the PCR parameters during a cleaning cycle of the PCR.

25. The PCR according to claim 23, wherein the processing circuit is further configured to automatically activate ancillary equipment that controls a temperatures of the fluid of the pool.

* * * * *